Aug. 9, 1966

R. J. VRATIL ETAL 3,265,227

TRUCK WITH AUGER RANGE FEEDER

Filed March 16, 1964

INVENTORS.
ROBERT J. VRATIL
LESTER G. VRATIL
BY LOUIS VRATIL
Van Valkenburgh and Fields
ATTORNEYS Aug. 9, 1966     R. J. VRATIL ETAL     3,265,227
TRUCK WITH AUGER RANGE FEEDER
Filed March 16, 1964     4 Sheets-Sheet 2

INVENTORS.
ROBERT J. VRATIL
LESTER G. VRATIL
BY   LOUIS VRATIL
Van Valkenburgh and Fields
ATTORNEYS

INVENTORS.
ROBERT J. VRATIL
LESTER G. VRATIL
BY LOUIS VRATIL

Van Valkenburgh and Fields

ATTORNEYS

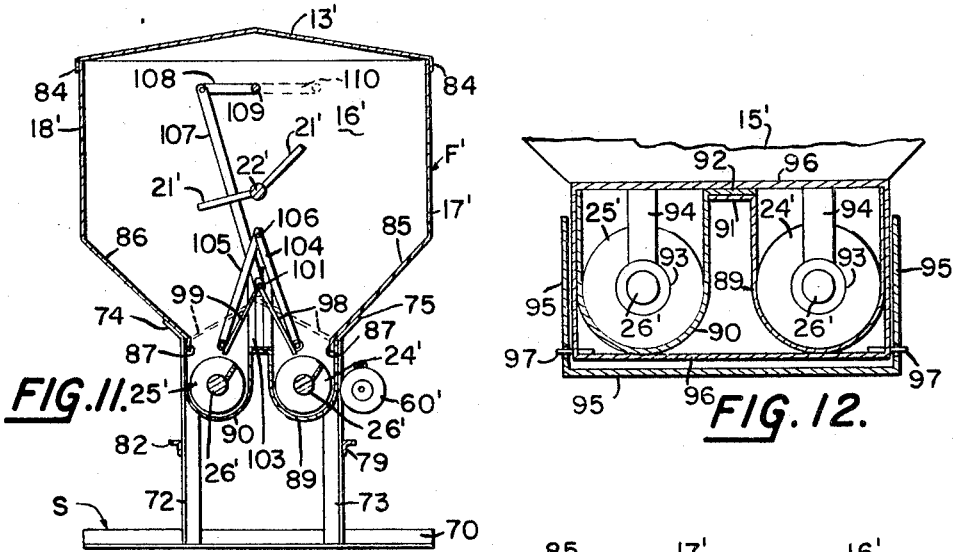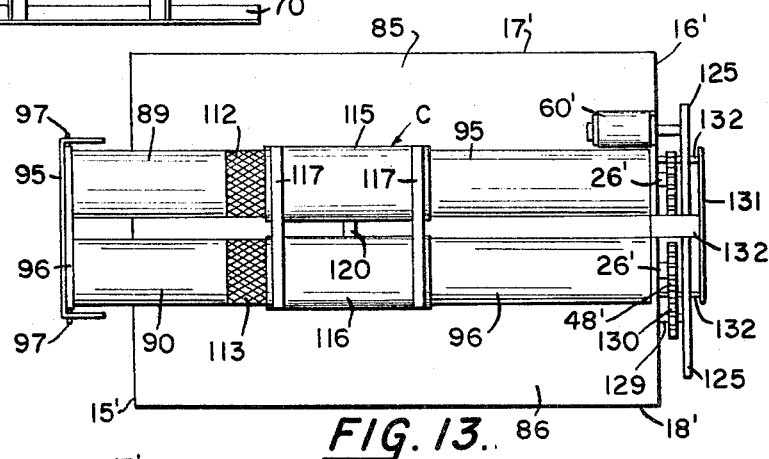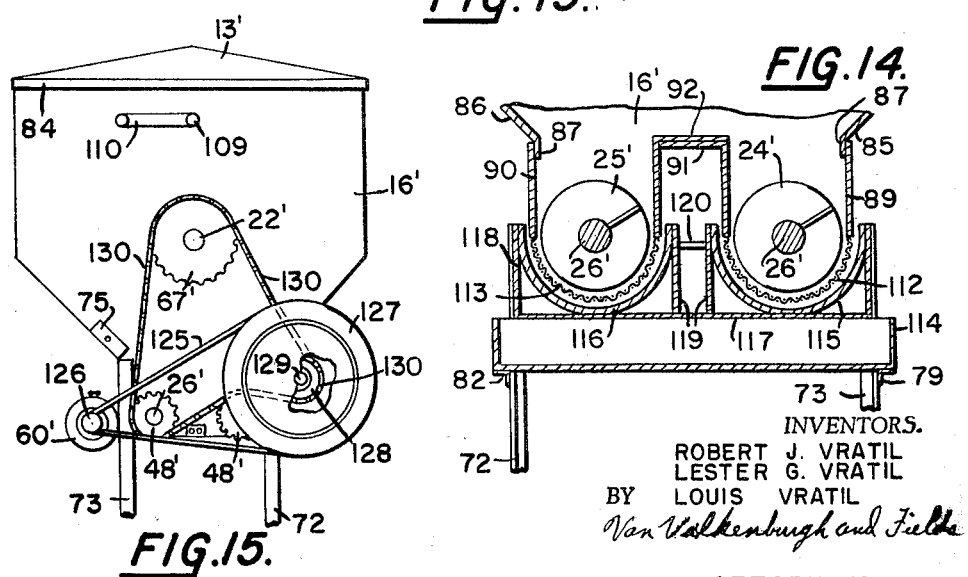

United States Patent Office 3,265,227
Patented August 9, 1966

3,265,227
TRUCK WITH AUGER RANGE FEEDER
Robert J. Vratil, Lester G. Vratil and Louis Vratil, all of 400 Main St., Limon, Colo.
Filed Mar. 16, 1964, Ser. No. 352,064
4 Claims. (Cl. 214—83.32)

This invention relates to a range feeder, and more particularly to a feeder for supplying feed troughs or the like from a moving vehicle, such as a pickup truck or the like.

Previously, it has been the custom to load a mixture of hay and grain in the bed of a pickup truck, by means of pitchforks or scoops, and then to throw the feed manually onto the ground or into troughs, for cattle or the like to eat. Special trucks have been devised, but these depend upon gravity for discharging the feed, which is thus difficult to regulate, and are useful for only the one purpose, and are also primarily useful only in large scale operations. A device for depositing feed for cattle or the like from a pickup truck has been devised, but this device is for use with grain only and discharges at the rear of the truck bed, so that a feed trough must either be shallow enough so that the truck may straddle it, or the grain must be deposited onto the ground. None of the prior arrangements, including the above, have been entirely satisfactory.

Among the objects of this invention are to provide a novel range feeder; to provide such a range feeder which will dispense a mixture of chopped hay and grain; to provide such a range feeder by which the feed may be dispensed from a moving vehicle, such as a pickup truck; to provide such a range feeder which may be mounted on a pickup truck in such a manner that, when the feeder is not being used, the bed of the pickup truck may be used for the other jobs, without the necessity of removing the range feeder; to provide such a range feeder which will collect grain that separates from the mixture; to provide such a range feeder having a discharge chute which extends laterally when in use but, when not in use, may be disposed in a position which does not unduly increase the width of the truck; to provide such a range feeder through which the truck on which the range feeder is mounted may merely be driven along a trough for discharging the feed; to provide such a range feeder wherein a drive motor for driving discharge augers can be controlled from the cab; to provide such a range feeder, in one embodiment of which the discharge chute closes the feed discharge holes when not in operation, so that no feed is lost therethrough; to provide, in another embodiment, a range feeder which is supported on a frame within the bed of a pickup truck; to provide such a range feeder in which the flow of the mixture of hay and grain can be controlled; to provide such a range feeder in which the separation of the grain from the hay may be controlled; and to provide such a range feeder which is simple in construction, yet efficient in operation.

Additional objects and the novel features will become apparent from the description which follows, taken in conjunction with the accompanying drawings, in which:

FIG. 11 is a vertical section, taken along line 11—11 of FIG. 10, showing particularly an adjustable feed control mechanism for the augers;

FIG. 12 is a vertical section of a portion of the discharge end of the feeder, taken along line 12—12 of FIG. 10;

FIG. 13 is a bottom plan view of the range feeder of FIG. 8, with a discharge spout in closed position and without a grain collection pan;

FIG. 14 is a fragmentary vertical section, taken along line 14—14 of FIG. 10, showing particularly the construction of the grain separator and collector; and FIG. 15 is a rear elevation of the range feeder of FIG. 8, showing particularly the drive mechanism therefor.

Figure 1:
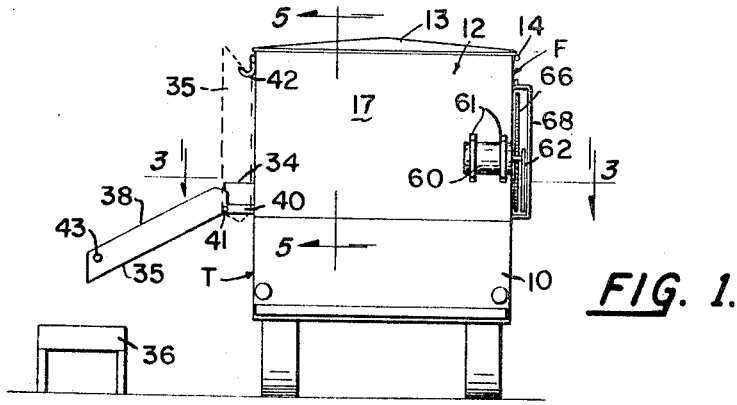
FIG. 1 is a rear elevation of a pickup truck having a range feeder of this invention mounted on the bed thereof.
Figure 2:
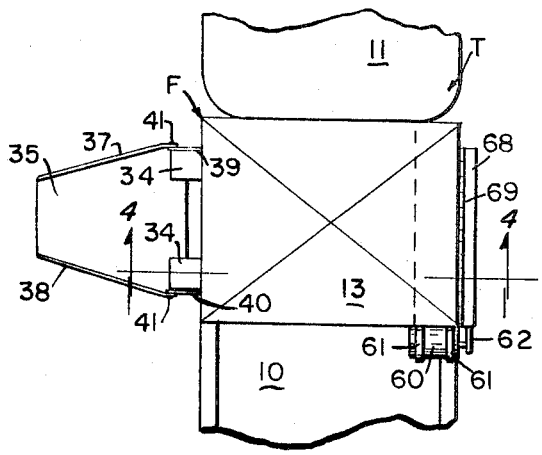
FIG. 2 is a fragmentary top plan view of the pickup truck of FIG. 1, showing the range feeder positioned at the front of the truck bed.

As in FIGS. 1–7, a range feeder F, constructed in accordance with this invention, is mounted on the forward end of the bed 10 of a pickup truck T, as in FIGS. 1 and 2, adjacent the cab 11, to permit maximum use of the remainder of the bed 10, as for hauling hay or other feed during feeding, or other items or tools when the feeder is not in use. The feeder F may, of course, be made in various sizes, such as up to the size of bed 10, but when smaller than the bed is preferably mounted as close to the cab as possible for the above reason. Each end of the feeder is, of course, supported by the corresponding upstanding side of the bed 10, while one side of the feeder rests on the upstanding front of the bed. For additional support, an angle may be placed across the bed, with one leg beneath the side edge of the feeder F toward the rear of the bed. The feeder F is provided with a hopper 12 in which the feed, such as a mixture of grain and chopped hay, is received and which is conveniently dimensioned to be supported by the sides and front of the truck bed, as described. Hopper 12 has a lid 13, hinged to one side of the hopper by means of a hinge 14 to facilitate filling the hopper and also cleaning and/or repair of the internal mechanism, to be described. The entire hopper may be made of sheet metal, as by front and rear or end walls 15 and 16 formed integrally with side walls 17 and 18 attached, as by welding or riveting, to inturned flanges 19 of end walls 15 and 16, respectively. Lid 13 may be creased diagonally, as shown for added strength, while a bottom 20 may be attached, as by welding or riveting, to the lower edges of the side and end walls.

Figure 4:
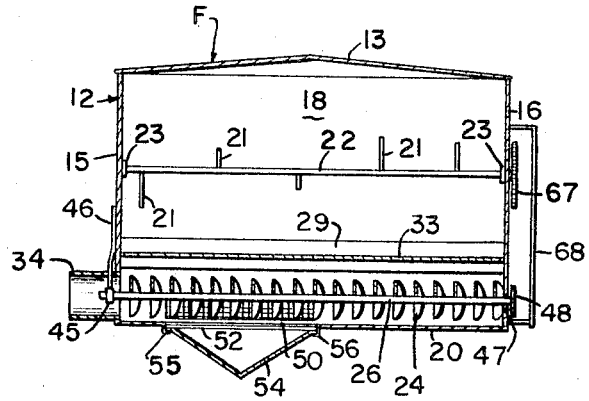
FIG. 4 is a vertical section, taken along line 4—4 of FIG. 2 through one of the augers, showing a stirring means, as well as a grain collection means.
Figure 5:
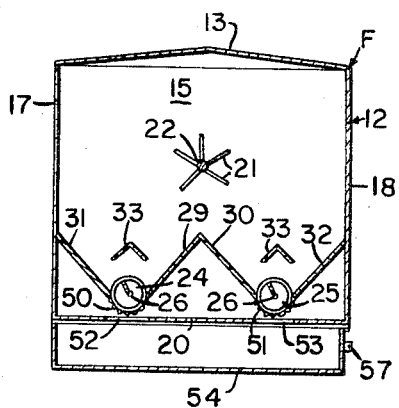
FIG. 5 is an enlarged vertical section, taken along line 5—5 of FIG. 1, showing augers, stirring means and associated parts.

Conveniently, the feed may be placed in the hopper 12 and is stirred by a plurality of stirring arms 21 extending through the center of the hopper, as in FIGS. 4 and 5, is journaled in bearings 23 attached to end walls 15 and 16, respectively, as in FIG. 4. A pair of longitudinally extending auger flights 24 and 25 are each mounted on a shaft 26, at the bottom of the hopper in troughs 27 and 28, respectively, each of which extends to a discharge opening in front wall 15. Troughs 27 and 28 at the inside may be attached, as by welding, to the lower edges of angular plates 29 and 30, the upper edges of which are attached, as by welding, or may be formed integrally in an inverted V-shape, and at the outside to angular plates 31 and 32, respectively. If desired, troughs 27 and 28, central plates 29 and 30 and outer plates 31 and 32 may be integral, conveniently being formed to shape from a single piece of sheet metal and welded or otherwise suitably attached to end walls 15 and 16 and side walls 17 and 18 of the hopper 12. Spaced above the augers 25 and 26 are inverted V-shaped guides 33, which extend between end walls 15 and 16 and prevent the full weight of the feed from bearing down on the augers. Thus, the feed is directed from each side and downwardly toward the augers.

A pair of short tubes 34 extend outwardly from the discharge openings in wall 15 and are adapted to discharge the feed, which is fed by auger flights 24 and 25 into a chute 35, which deposits the feed in a feed trough 36, as in FIG. 1, or onto the ground. Conveniently, the chute 35 is narrower at the discharge end and is provided with converging side walls 37 and 38, as in FIGS. 2 and 3, which are parallel at their rear ends. A pair of spaced angle brackets 39 and 40 are attached to wall 15 of the hopper and discharge chute 35 is pivoted thereto by means of pivot pins 41 and 42, extending through the parallel rear ends of side walls 37 and 38 for pivoting the chute from the discharge position to the storage position, the latter being shown in dotted lines in FIG. 1. Preferably, pivot pins 41 and 42 are so located that when chute 35 is swung to the storage position, the bottom of the chute will engage and cover the end of each tube and prevent the feed from being discharged therefrom. As will be evident, the truck T may be driven along feed trough 36, or a series of similar troughs, to distribute the feed therein. When passing from one feed trough to another, the augers may be shut off, to prevent loss of feed. For traveling a considerable distance between feed troughs, or when the feeder F is not in use but contains feed, the discharge chute 35 is preferably swung upwardly to the dotted position of FIG. 1. The discharge chute 35 may be held in such position in any suitable manner, as by a pair of spaced hooks 42 adapted to be inserted in a hole 43 in each side wall of the discharge chute.

Figure 3:
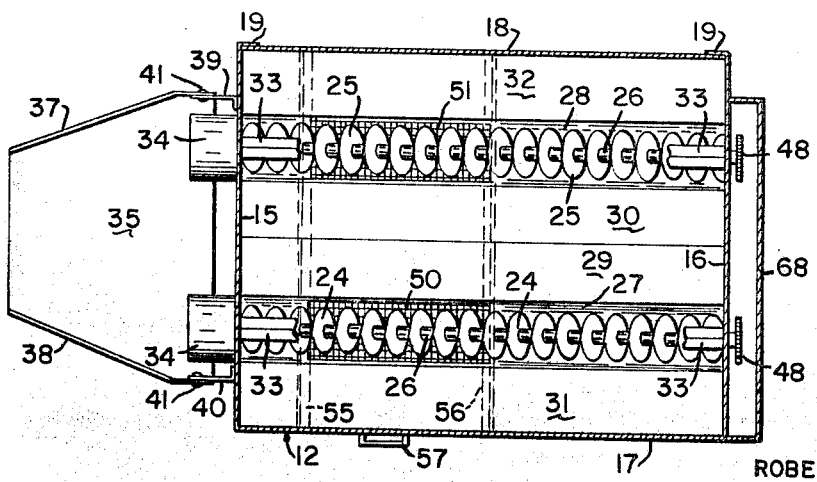
FIG. 3 is an enlarged horizontal section, taken along line 3—3 of FIG. 1, showing details of the augers and associated parts and the discharge chute.

The discharge end of each auger shaft 26 is rotatably supported by a bearing 45, in turn supported by a metal strap 46 which is attached to wall 15 and extends through a slot in the upper side of the respective tube 34, while the opposite end of each shaft 26 may be rotatably supported by a bearing 47, conveniently mounted in wall 16, as in FIG. 4, through which each shaft 26 extends for attachment of a drive sprocket 48 thereto, as in FIG. 3, in which other drive sprockets and the chains therefor are omitted, for clarity of illustration.

Any grain which separates from the feed mixture, during movement by auger flights 24 and 25, will pass through a screen 50 or 51, substituted for a portion of the bottom of trough 27 or 28, respectively, near the discharge end thereof, and then through openings 52 and 53 in bottom 20 of hopper 12, as in FIG. 4, being collected in a generally V-shaped, transversely extending pan 54. Pan 54 is slidably mounted in channels 55 and 56, and may be removed by means of a handle 57, which is located at the rear of the feeder F, so that the pan 54 may be removed while the feeder F remains on the truck bed.

Figure 7:
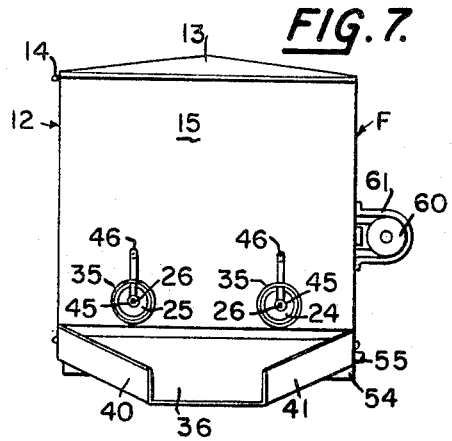
FIG. 7 is a side elevation of the opposite side of the range feeder, showing the discharge openings and chute.
Figure 6:
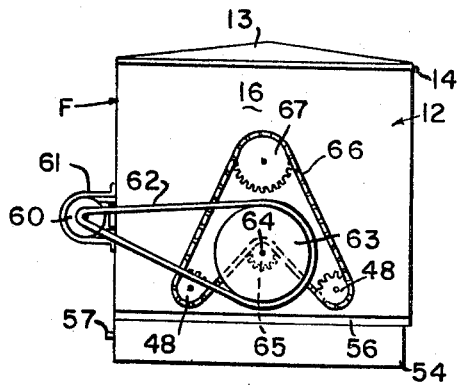
FIG. 6 is a side elevation of the range feeder, showing the motor drive arrangement.

The augers and the stirring rod may all be driven by a D.C. motor 60, attached to wall 17 of range feeder F by means of brackets 61, as in FIGS. 1, 6 and 7. The motor 60 may be powered from the truck generator (not shown) and controlled by a switch (not shown) in the cab of the truck, so that the feeding operation can be started and stopped as the truck is being driven along, without the necessity of the operator climbing down out of the truck to stop the operation of the augers. The motor 60 is connected through a belt 62 to a larger pulley 63, rotatably mounted on a shaft 64 extending from wall 16 of the range feeder, for rotating a sprocket 65, as in FIG. 6, which is attached to pulley 63 and rotates with it, between pulley 63 and housing wall 16. An endless chain 66 extends around sprockets 48 attached to the ends of auger shafts 26, and also around a larger sprocket 67 attached to the end of stirring rod 21, which extends through wall 16 of hopper 12. Sprocket 64 is engaged by the opposite side of chain 66, to maintain the chain tight and drive the stirring rod and augers simultaneously. Since sprocket 67 is larger than sprockets 48, the stirring rod will be turned at a slower speed than the augers. Conveniently, the sprockets, chains and belt are covered by a housing 68 to prevent dirt and other foreign matter from entering the drive mechanism, while housing 68 is conveniently pivoted at the top, as by a hinge 69 of FIG. 2, to permit easier access to the drive mechanism for maintenance, such as oiling or greasing. One side of housing 68 is omitted in FIG. 1, while housing 68 is not shown in FIG. 6, each for clarity of illustration.

Figure 8:
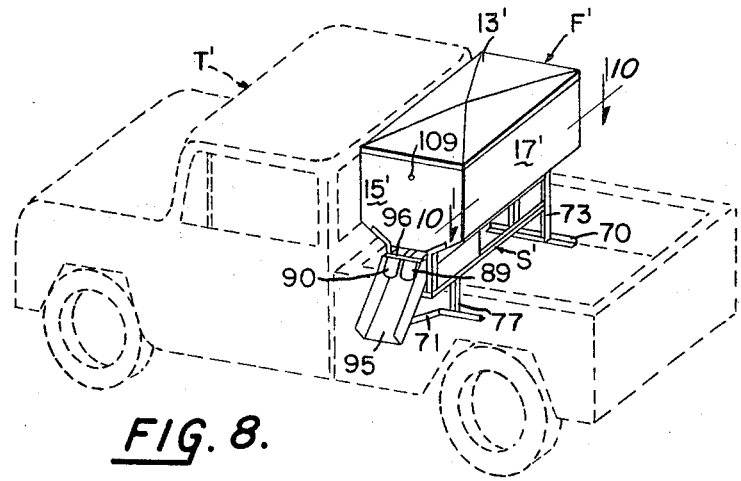
FIG. 8 is an end perspective view of an alternative range feeder of this invention, with the pickup truck on which it is mounted shown in dotted lines.
Figure 9:
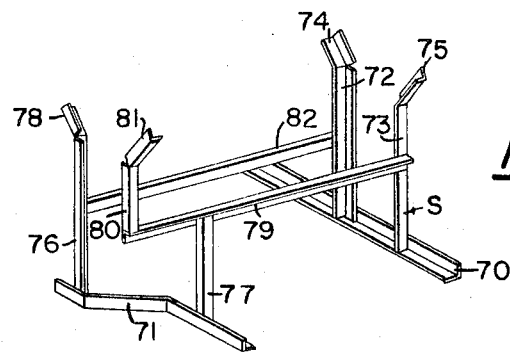
FIG. 9 is a side perspective view of the frame for the range feeder of FIG. 8.

An alternative feeder F' of this invention, shown in FIGS. 8–15, is mounted on a supporting frame S within the bed of a pickup truck T', shown in dotted lines in FIG. 8. As in FIG. 9, the supporting frame S is conveniently formed of angle irons and includes a straight foot 70 which is adapted to abut the right rear wheel well and spaced therefrom an angular foot 71 which is formed so as to fit around the left rear wheel well. A pair of spaced vertical legs 72 and 73 extend upwardly from foot 70 and have outwardly bent ends 74 and 75, respectively, formed by cutting through one web of the angle iron and bending the other web, for receiving and supporting the corners of feeder F'. Similarly, a longer vertical leg 76 extends upwardly adjacent the front end of foot 71 and a shorter vertical leg 77 extends upwardly adjacent the rear end thereof. The upper end of leg 76 has an outwardly extending end 78 adapted to receive a front corner of feeder F', whereas the shorter leg 77 supports a cross bar 79 on which is mounted an upwardly extending arm 80, which terminates in an outwardly extending end 81 for supporting the corresponding rear edge of the feeder F'. Also, a cross member 82 extends between vertical legs 72 and 76 for strengthening purposes. Thus, the four corner edges of the feeder F' are supported in the frame, with the ends of the legs preferably bolted to the feeder, and the frame rests on the bottom of the bed of the truck. This has the advantage of supporting the feeder, so that it does not rest on the sides of the pickup truck and causes them to bulge outwardly or to receive stresses for which they were not intended.

Feeder F' is similar in general construction to feeder F but varies in certain details of construction which will appear below. Thus, the hopper conveniently may be made of sheet metal, having side walls 17' and 18' formed integrally with a front wall 15' and a rear wall 16', as in FIG. 10. The lid 13', as in FIGS. 8 and 11, is formed to fit over the top of the hopper, having a depending peripheral flange 84 and being creased diagonally, for added strength. As in FIG. 11, side wall 17' terminates at the bottom in an inwardly and downwardly extending panel 85, while side wall 18' also terminates in a similar inwardly and downwardly extending panel 86, each of which has a downwardly extending lip 87 at the lower edge. The bottom of the hopper is closed by a pair of longitudinally extending troughs 89 and 90, trough 89 having a central horizontal flange 91 which is received under a similar central horizontal flange 92 of trough 90, as in FIGS. 11 and 14, the two flanges being welded together and each lip 87 being welded to the inside of the outer upper edge of each trough, to complete the bottom. A pair of longitudinally extending auger flights 24' and 25' are mounted on shafts 26' and are disposed in troughs 89 and 90, being journaled in rear wall 16' of the hopper and in bearings 93 suspended by brackets 94, as in FIG. 12, from the front wall 15'. The auger flights extend the full length of the hopper, while troughs 89 and 90 extend beyond front wall 15'. The feed is discharged from the extended ends of troughs 89 and 90 onto a chute 95 which is pivoted on a rectangular frame 96, as in FIG. 12, by pins 97, the frame 96 extending around the troughs and being attached thereto, as by welding. As in FIG. 13, chute 95 may be pivoted upwardly against the ends of troughs 89 and 90, when discharge of feed is not desired, as when traveling from one feed area to another or using the truck for other purposes. In this position, the sides of chute 95 extend upwardly on each side of troughs 89 and 90, while the chute may be secured in its upper position by a chain or other latching device. As will be evident, the length of feeder F' may be somewhat less than the width of the truck bed, while the width of the feeder is less than the length of the truck bed, leaving space for transportation of articles in the bed without removing the feeder therefrom.

Figure 10:
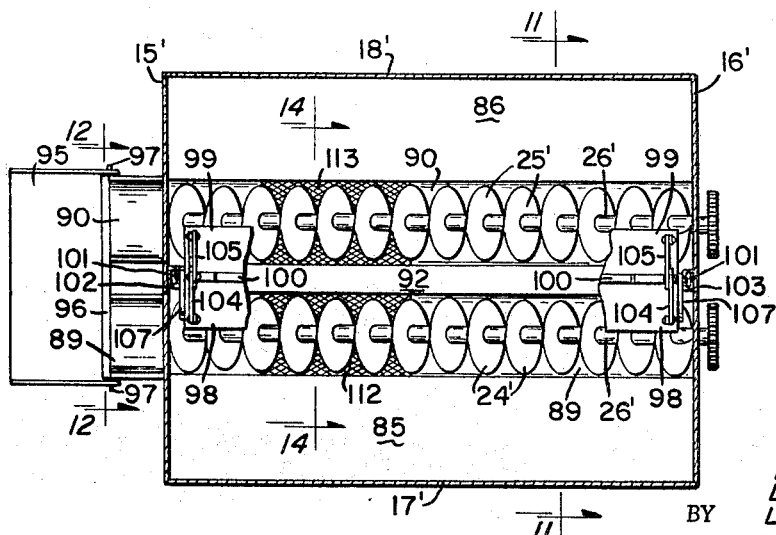
FIG. 10 is a longitudinal, horizontal section, taken along 10—10 of FIG. 8, showing the interior of the range feeder.

The flow of feed from the hopper to the augers is controlled by movable panels 98 and 99, as best seen in FIGS. 10 and 11, which are pivoted to each other along their adjacent edges by means of hinge ears 100 of the piano hinge type. A hinge pin 101 extends through the hinge ears and from each end thereof, being confined for vertical movement in guides 102 and 103 mounted on front wall 15' and rear wall 16', respectively. A pair of links 104 and 105, at each end of the panels, are pivotally connected to each other by a pivot pin 106 and the opposite ends thereof are pivoted to panels 98 and 99, respectively, adjacent the outer edges thereof. An operating arm 107, as in FIGS. 10 and 11, is pivotally connected to each end of the hinge pin 101, inwardly of the guides 102 and 103 and is adapted to move the hinge pins upwardly and downwardly in the guides to move the panels 98 and 99 toward and away from each other, between the full and dotted positions of FIG. 11. As will be evident, panels 98 and 99, in the dotted position of FIG. 11, will cover the troughs 89 and 90, so that the feed will not flow to the augers, or to any intermediate position or the full line position of FIG. 11, for maximum flow of feed to the augers. The latter position is preferably one in which the lower edges of panels 98 and 99 are located over the center line of the augers. The upper end of each arm 107 is pivotally connected to a lever 108, whose opposite end is connected to a rod 109 extending longitudinally through the hopper and through walls 15' and 16', through bearings mounted on the side walls. For adjusting panels 98 and 99 from a position exteriorly of the hopper, a handle 110 is connected to the outer end of rod 109 outside rear wall 16', as in FIG. 15.

The troughs 89 and 90 are each provided with a screen section 112 or 113, respectively, for separating any grain which sifts to the bottom of either trough. This separated grain is collected in a tray or pan 114 which rests on cross members 79 and 82 of frame S, as in FIG. 14. The amount of screen area exposed may be controlled by a slidable cover C, which is adapted to be supported by tray 114 and to cover or expose screens 112 and 113, as desired. Sliding cover C comprises a pair of U-shaped plates 115 and 116 which, as in FIGS. 13 and 14, are joined together by a pair of brackets 117 extending across the bottoms thereof, conveniently welded thereto and having upwardly extending, outer arms 118, as in FIG. 14, conveniently welded to the outer sides of the U-shaped plates. Also, a pair of upwardly extending braces 119 extend upwardly from brackets 117 to the upper edges of the U-shaped plates on the inside, as in FIG. 14, while plates 115 and 116 may be further reinforced by a central cross brace 120, also welded thereto. Conveniently, brackets 117 rest upon grain collecting tray 114, so that the cover may be slid therealong to open or close the openings at screens 112 and 113.

The grain and hay mixture within the hopper is continually stirred by arms 21' extending radially from a stirring rod 22', which is journaled in the hopper above the auger flights, as in FIG. 11. The auger flights 24' and 25', as well as stirring rod 22', are driven by a motor 60', conveniently mounted on leg 73 of the frame S, as in FIG. 15. An endless belt 125 extends from motor pulley 126 to and around a large speed reduction pulley 127 to drive sprocket 128 which is mounted coaxially with pulley 127 on shaft 129. Sprocket 128 is inside pulley 127 and drives an endless chain 130 which engages a larger sprocket 67' mounted on stirring rod 22' and a pair of smaller sprockets 48' mounted on the auger flight shafts 26'. So that the augers will be turned in opposite directions, the inside of chain 130 engages one sprocket 48' and the outside of chain 130 engages the other sprocket 48'. For protection of the driving mechanism, a shield 131 may be mounted outwardly therefrom, as in FIG. 13, being supported by brackets 132.

From the foregoing, it will be evident that the objects and requirements hereinbefore set forth have been fulfilled to a marked degree. Thus, a range feeder has been provided which can be mounted on the top of the bed of a pickup truck so that feed, such as a mixture of chopped hay and grain, can be dispensed from the vehicle as it is moving. In this regard, the motor for driving the augers and the stirring rod is controlled from the cab of the vehicle, so that the feeding of the grain can be stopped without stopping the vehicle and climbing down out of it to turn the motor off. Furthermore, with the range feeder mounted at the front of the bed of the pickup truck, the bed is still usable for other work when the feeder is not being used. In addition, the discharge chute of the feeder may be folded up into a storage position when not in use, and when in storage position it closes the ends of the discharge troughs or tubes, so that feed is not lost. Also, means is provided within the hopper for catching grain which separates from the mixture, the grain being caught by a removable pan, so that it may again be mixed with the feed. While the range feeder is of simple construction, it is apparent that it is highly useful and effective in operation.

Although two embodiments of this invention have been illustrated and described, it will be understood that other embodiments may exist and that various changes and variations may be made in each embodiment and that features of one embodiment may be incorporated in the other embodiment, without departing from the spirit and scope of this invention.

What is claimed is:

1. In combination with a pickup truck having a fixed, box-shaped bed with fixed sidewalls extending a short distance above the bed surface, a range feeder for dispensing a grain-silage mixture and like material having a hopper-shaped body including laterally inclined floor portions merging into a longitudinally-disposed chute extending from one end of the body as a discharge tube and an auger within the chute to drive material into the discharge tube, wherein:

said feeder is proportioned to be mounted with its chute lying transversely across the truck bed box with its bottom being substantially at the level of the top of the truck box sidewalls and the discharge tube extending over a sidewall for deposit of material from the side of the truck; and means adapted to support the feeder transversely across the truck bed, above the bed, and substantially at the level of the top of the truck box.

2. In the combination defined in claim 1, including:

a flat-bottom chute connected to said body at the end of the discharge tube, said connection including pivot means below the end of the discharge tube adapted to permit the chute to be swung upwardly with the bottom thereof being moved against the tube exit to gate the tube closed; and means to hold the trough in the up position.

3. In the combination set forth in claim 1, including:
- a screen at the bottom of the chute adapted to divert unmixed grain from the chute as the food mix moves from the chute and into the discharge tube; and
- a pan disposed between the truck bed and the hopper adapted to receive grain diverted through the screen.

4. In a range feeder for dispensing a grain-silage mixture and like material, having a hopper-shaped body, a pair of longitudinally-disposed chutes at the base thereof arranged in spaced parallelism, a discharge opening at the end of each chute, laterally inclined floor portions merging into the outward side of each of the chutes, auger means in each chute adapted to move material to the discharge opening, and a control gate system for regulating the movement of material into each chute with substantially the same amount of material moving into each chute, the improvement comprising:
- a longitudinally-disposed, flat topped divider upstanding between the chutes;
- a longitudinally-disposed gate member formed as a pair of panels hinged together at abutting longitudinal edges;
- a pin extending from each end of the hinged edges of said panels;
- a fixed guide at each end of the hopper upstanding from the flat topped divider at the approximate center plane between the chutes and adapted to receive said pins for vertical movement;
- crank means extending longitudinally of the hopper above the guides for applying a force to move the pins upwardly and downwardly in said guide; and
- means for moving the outer edges of the panels inwardly and outwardly, responsive to upward and downward movement of the pins, to open and close the gate and provide a variable opening between the hopper and the chutes and including a first link pivoted at the lower end adjacent to the outer edge of one of said panels, a second link pivoted at the lower end adjacent to the outer edge of the other of said panels and a pivot affixed to the hopper directly above the guides, interconnecting the upper ends of the first and second links.

References Cited by the Examiner

UNITED STATES PATENTS

| | | | |
|---|---|---|---|
| 2,393,849 | 1/1946 | Werts | 198—64 X |
| 2,412,121 | 12/1946 | Bradshaw. | |
| 2,601,608 | 6/1952 | Hansen | 214—83.32 X |
| 2,633,255 | 3/1953 | Hoffstetter | 214—83.32 X |
| 2,706,046 | 4/1955 | Andrews. | |
| 2,849,137 | 8/1958 | Hansen | 214—522 |
| 2,939,592 | 6/1960 | Hoffstetter | 198—64 X |
| 2,960,320 | 11/1960 | Heider. | |
| 2,970,710 | 2/1961 | Jensen | 214—83.32 X |
| 2,991,870 | 7/1961 | Griffith et al. | 198—64 |
| 2,998,152 | 8/1961 | Wognum et al. | 198—64 X |
| 3,021,025 | 2/1962 | Sudenga et al. | 198—64 X |
| 3,084,821 | 4/1963 | Knight | 214—519 |

OTHER REFERENCES

"Implement and Tractor" magazine; issue of Sept. 7, 1957; page 35 relied on.

EVON C. BLUNK, *Primary Examiner.*

SAMUEL F. COLEMAN, *Examiner.*

R. E. KRISHER, *Assistant Examiner.*